(12) United States Patent
Crochet et al.

(10) Patent No.: US 10,889,248 B2
(45) Date of Patent: Jan. 12, 2021

(54) SYSTEM FOR COVERING THE LUGGAGE COMPARTMENT OF A MOTOR VEHICLE

(71) Applicant: TREVES PRODUCTS, SERVICES & INNOVATION, Paris (FR)

(72) Inventors: Laurent Crochet, Fismes (FR); Alicia Lecomte, Villers-Franqueux (FR)

(73) Assignee: TREVES PRODUCTS, SERVICES & INNOVATION, Paris (FR)

( * ) Notice: Subject to any disclaimer, the term of this patent is extended or adjusted under 35 U.S.C. 154(b) by 198 days.

(21) Appl. No.: 16/312,691

(22) PCT Filed: Jun. 19, 2017

(86) PCT No.: PCT/FR2017/051602
§ 371 (c)(1),
(2) Date: Jan. 4, 2019

(87) PCT Pub. No.: WO2017/220909
PCT Pub. Date: Dec. 28, 2017

(65) Prior Publication Data
US 2019/0168676 A1    Jun. 6, 2019

(30) Foreign Application Priority Data

Jun. 23, 2016 (FR) .................................... 16 55860

(51) Int. Cl.
*B60R 5/04* (2006.01)
*B60R 7/02* (2006.01)

(52) U.S. Cl.
CPC ............... *B60R 5/048* (2013.01); *B60R 5/045* (2013.01); *B60R 5/047* (2013.01); *B60R 7/02* (2013.01)

(58) Field of Classification Search
CPC ......... B60R 5/048; B60R 5/045; B60R 5/047; B60R 7/02

(Continued)

(56) References Cited

U.S. PATENT DOCUMENTS 6,966,591 B2 * 11/2005 Schlecht ................. B60R 5/047
160/370.22
7,438,338 B1 * 10/2008 Schumacher ............. B60R 5/04
222/404

(Continued)

FOREIGN PATENT DOCUMENTS

DE    29810132 U1    10/1998
DE    19825353 C2    10/2001

(Continued)

OTHER PUBLICATIONS

International Search Report issued in corresponding application No. PCT/FR2017/051602, dated Sep. 26, 2017.

*Primary Examiner* — Joseph D. Pape
(74) *Attorney, Agent, or Firm* — Murtha Cullina LLP

(57) ABSTRACT

The invention is a system for covering a luggage compartment having two lateral supports and a front panel pivotably connected to the supports. A rear panel is also pivotably connected to the lateral supports A carriage is slidably mounted on a longitudinal guide rail rigidly connected to a first of the supports. Two cable sections each having an end associated, respectively, with either side of the carriage, and being kept permanently tensioned along a longitudinal axis is also included with a wheel actuated by a motor. The wheel is rigidly connected to the sections in order to allow one or the other, as desired, to be pulled in a longitudinal direction, in order to move the carriage forwards or backwards in order to move the panels to allow access to the compartment or to cover it.

9 Claims, 3 Drawing Sheets

(58) Field of Classification Search
USPC .................................................... 296/37.16
See application file for complete search history.

(56) References Cited

U.S. PATENT DOCUMENTS

2007/0120391 A1\* 5/2007 Hori .................. B60R 5/047
296/100.15
2008/0277954 A1\* 11/2008 Brooks ................ A63C 11/025
294/147

FOREIGN PATENT DOCUMENTS

| | | |
|---|---|---|
| EP | 2062781 A1 | 5/2009 |
| FR | 3019119 A1 | 10/2015 |
| JP | 2008037190 A | 2/2008 |
| JP | 2009062021 A | 3/2009 |
| WO | 2013120698 A1 | 8/2013 |

\* cited by examiner

SYSTEM FOR COVERING THE LUGGAGE COMPARTMENT OF A MOTOR VEHICLE

CROSS-REFERENCE TO RELATED APPLICATION

This application claims the benefit of International application number PCT/FR2017/051602, filed Jun. 19, 2017 and French application no. 1655860, filed Jun. 23, 2016 the entire contents of which are incorporated herein by reference.

TECHNICAL FIELD

The invention concerns a system for covering the luggage compartment of a motor vehicle.

BACKGROUND

A system for covering the luggage compartment of a motor vehicle is known, the system comprising:
two lateral supports,
a front panel pivotably connected to the supports about a first transverse shaft lying along the front edge of the panel,
a rear panel pivotably connected to the supports about a second transverse shaft, the second shaft being slidably mounted longitudinally with respect to the supports,
a hinge connecting the rear edge of the front panel to the front edge of the rear panel about a third transverse axis of rotation, the hinge being arranged so that, when force is applied to the second shaft in a forward direction, the panels are caused to rotate in an upward direction, thus causing them to transition from a covering configuration, in which they lie horizontally as an extension of each other, to an access configuration for accessing the compartment, in which they are folded against each other.

With such an arrangement there is the problem of being able to cause the panels to transition in a simple and reliable way from their covering configuration to their access configuration and vice versa, particularly when the panels are actuated by an actuation device comprising motorized means.

SUMMARY OF THE INVENTION

The purpose of the invention is to propose an arrangement allowing these objectives to be achieved.

To that end, the invention proposes a system for covering the luggage compartment of a motor vehicle, the system comprising:
two lateral supports,
a front panel pivotably connected to the supports about a first transverse shaft lying along the front edge of the panel,
a rear panel pivotably connected to the supports about a second transverse shaft, the second shaft being slidably mounted longitudinally with respect to the supports,
a hinge connecting the rear edge of the front panel to the front edge of the rear panel about a third transverse axis of rotation, the hinge being arranged so that, when force is applied to the second shaft in a forward direction, the panels are caused to rotate in an upward direction, thus causing them to transition from a covering configuration, in which they lie horizontally as an extension of each other, to an access configuration for accessing the compartment, in which they are folded against each other, the system furthermore comprising:
a first carriage receiving a first end of the second shaft, the carriage being slidably mounted on a first longitudinal guide rail rigidly connected to a first of the supports,
a first and a second cable sections, each of which having an end associated respectively with either side of the carriage, and being kept permanently tensioned along a longitudinal axis,
a wheel actuated by a motor, the wheel being rigidly connected to the sections in order to allow one or the other, as desired, to be pulled in a longitudinal direction in order to move the carriage forwards or backwards in order to move the panels into the access configuration or the covering configuration.

In this description, the spatial positioning terms (up, longitudinal, transverse, lateral, front, rear, horizontal, etc.) are considered in reference to the system once installed in the vehicle.

With such an arrangement, by being motorized, the panels transition from their covering configuration and to access configuration, and vice versa, in a simple and reliable way.

BRIEF DESCRIPTION OF THE DRAWINGS

Other particularities and advantages of the invention are presented in the following description, which is given in reference to the enclosed figures wherein.

DETAILED DESCRIPTION

Figure 1:
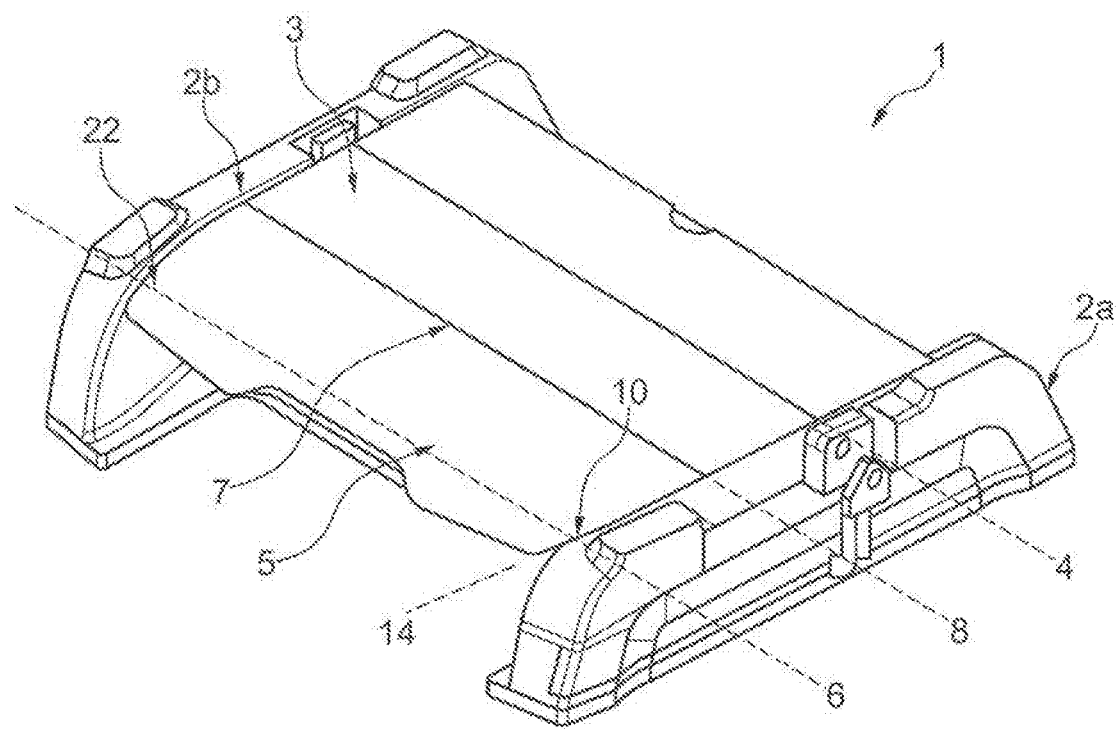
FIG. 1 is a perspective schematic view of a system according to an embodiment, in which the panels are arranged in the covering configuration.

System 1 for covering the luggage compartment of a motor vehicle is described in reference to the figures, the system comprising:
two lateral supports 2a,2b,
a front panel 3 pivotably connected to the supports about a first transverse shaft 4 lying along the front edge of the panel,
a rear panel 5 pivotably connected to the supports about a second transverse shaft 6, the second shaft being slidably mounted longitudinally with respect to the supports,
a hinge 7 connecting the rear edge of the front panel to the front edge of the rear panel about a third transverse axis of rotation 8, the hinge being arranged so that, when force is applied to the second shaft in a forward direction, the panels are caused to rotate in an upward direction, thus causing them to transition from a covering configuration, in which they lie horizontally as an extension of each other, to an access configuration for accessing the compartment, in which they are folded against each other, the system furthermore comprising:

a first carriage 9 receiving a first end 10 of the second shaft, the carriage being slidably mounted on a first longitudinal guide rail, unshown, which is rigidly connected to a first 2a of the supports, a first 12a and a second 12b cable sections each having an end 13a, 13b associated, respectively, with either side of the carriage, and being kept permanently tensioned along a longitudinal axis 14, a wheel 15 actuated by a motor 16, the wheel being rigidly connected to the sections in order to allow one or the other, as desired, to be pulled in a longitudinal direction, in order to move the carriage forwards or backwards in order to move the panels into the access configuration or the covering configuration.

Figure 2:
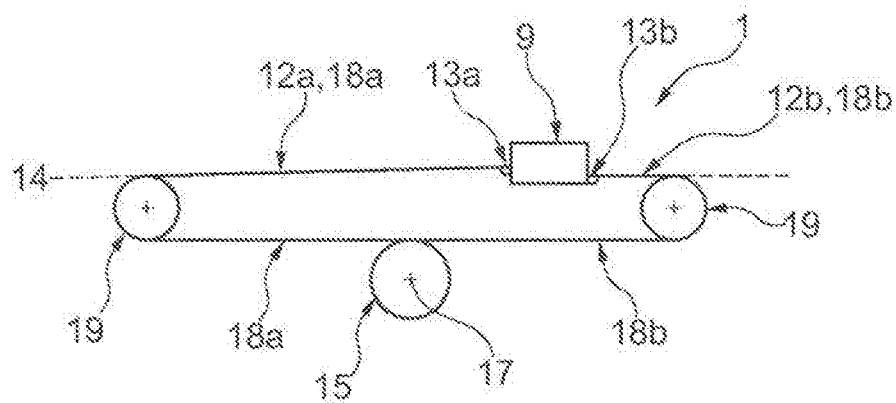
FIG. 2 is a top view of a partial schematic representation of a system according to a first embodiment.
Figure 3:
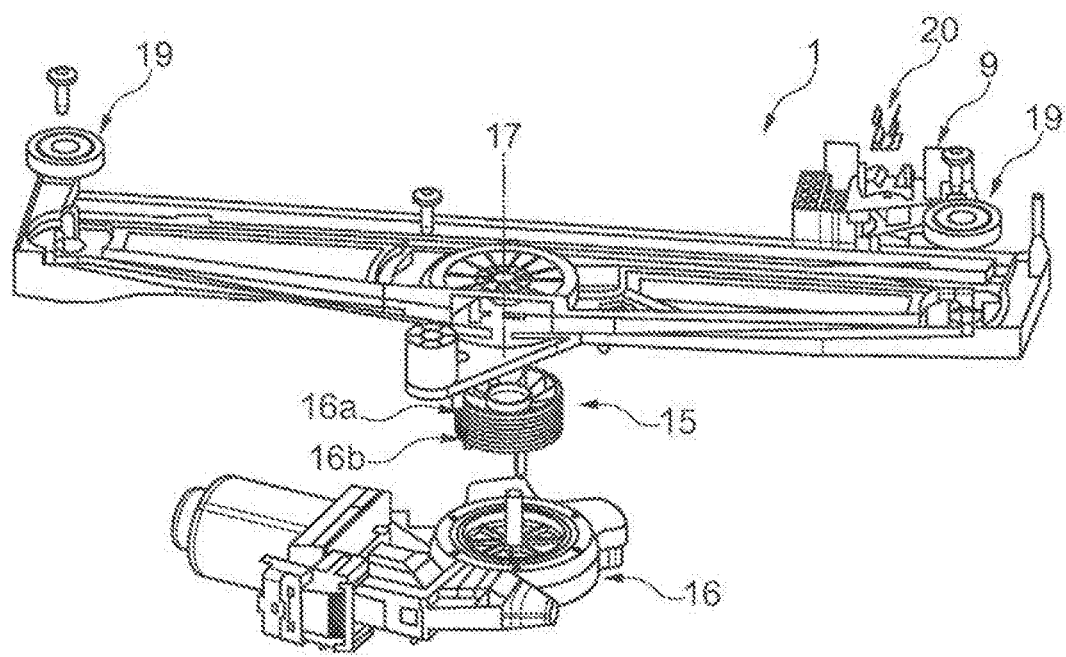
FIG. 3 is a partial schematic representation in exploded perspective view of the system of the first embodiment.

According to the embodiment shown in FIGS. 2 and 3, the wheel 15 comprises two grooves 16a,16b arranged in levels axially with respect to axis of rotation 17 thereof, each of the grooves receiving by winding respectively a first 18a and a second 18b cable defining respectively the first 12a and second 12b cable sections, the cables winding in two opposite directions in the grooves in such a way that the rotation of the wheel causes the winding of one and a corresponding unwinding of the other, the system furthermore comprising two pulleys 19 installed on the first support 2a at the respective ends of travel of the first carriage 9, the wheel being arranged substantially between the pulleys, each of the pulleys forming a return for each of the cables so as to keep the sections permanently tensioned.

Here it must be pointed out that, throughout this description, whenever it is the that the rotation of the wheel 15 causes a winding of a cable 18a,18b and a corresponding unwinding of the other cable 18b,18a, it means that the wound length of one is equal to the unwound length of the other.

Figure 4:
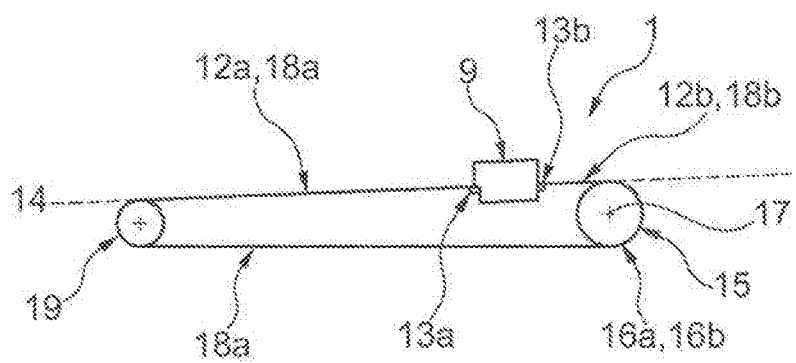
FIG. 4 is a top view of a partial schematic representation of a system according to a second embodiment.

According to the embodiment shown in FIG. 4, the wheel 15 comprises two grooves 16a,16b arranged in levels axially with respect to the axis of rotation thereof, each of the grooves receiving by winding respectively a first 18a and a second 18b cable defining respectively the first 12a and second 12b cable sections, the cables winding in two opposite directions in the grooves in such a way that the rotation of the wheel causes the winding of one and a corresponding unwinding of the other, the system furthermore comprising a pulley 19 installed on the first support 2a at a travel end of the first carriage 9, the wheel being arranged at the other end of the travel, the pulley forming a return for one 18a of the cables so as to keep the sections permanently tensioned.

Figure 5:
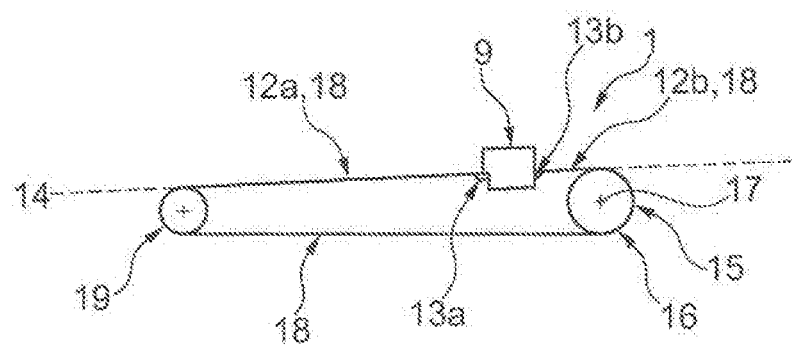
FIG. 5 is a top view of a partial schematic representation of a system according to a third embodiment.

According to the embodiment shown in FIG. 5, the wheel 15 comprises a groove 16 for receiving a cable 18, the cable being for example in the form of a rubber belt, the end parts of the cable defining the first 12a and second 12b cable sections, the system furthermore comprising a pulley 19 installed on the first support 2a at a travel end of the first carriage 9, the wheel being arranged at the other end of the travel so that the cable forms a tight loop passing around the wheel and the pulley so as to keep the sections permanently tensioned.

Here, the system is based on friction, with the cable 18 being moved by the wheel 15 by friction, and not by winding, as in the case of the embodiments described earlier.

By means not shown, for all the embodiments presented, the access configuration may correspond to a lifting of panels 3,5 by about 90° with respect to the position thereof in the covering configuration.

By means not shown, for all the embodiments presented, a second end 22 of the second shaft 6 can be mounted on a second carriage, the carriage being slidably mounted on a second longitudinal guide rail rigidly connected to a second support 2b.

According to an embodiment shown in FIG. 3 corresponding to the embodiment of FIG. 2, an end 10,22 of the second shaft 6 mounted on a carriage 9 is mounted so as to be removable, in the present case by nesting in an elastically deformable housing 20 having a general cross-section in the shape of the letter Ω.

Such an arrangement can naturally be applied to all the embodiments presented.

In this way the system 1 can be removed from the vehicle or, if the access configuration corresponds to a lifting of panels 3,5 by about 90° with respect to the position thereof in the covering configuration, the panels may be folded further by 180°, thus allowing them to be stacked horizontally.

Figure 6:
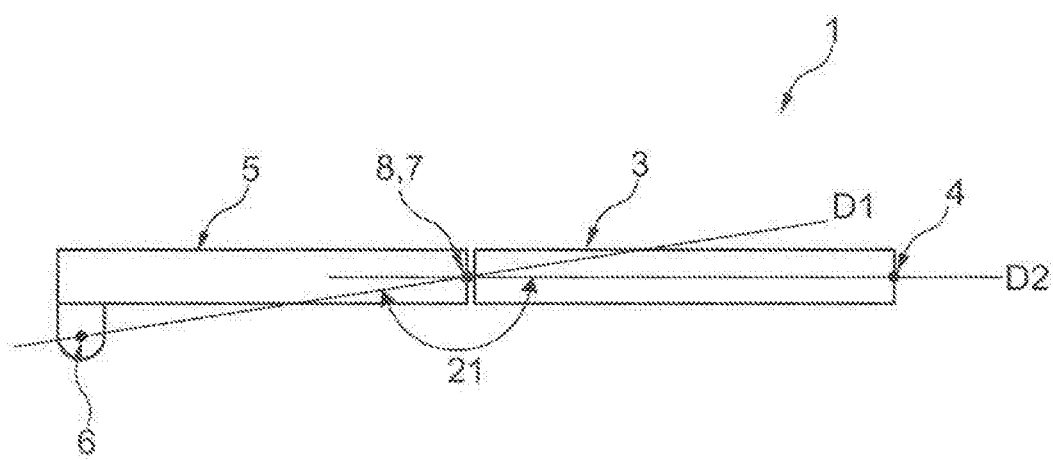
FIG. 6 is a partial schematic side view showing a system in which the positioning of the transverse shafts allows for actuation of the panels from their covering configuration to their access configuration by forward pressure on the second shaft.

According to an embodiment shown in FIG. 6, with such an arrangement being applicable to all the embodiments described above, the rear end of each rail is arranged so that when panels 3,5 are in the covering configuration, and when observed laterally, the lower angle 21 defined by a first straight line D1 connecting the second 6 and third 8 shafts, and by a second straight line D2 connecting the first 4 and third 8 shafts is less than 180° so that a force exerted forwards on the second shaft by means of the first carriage 9 causes the panels to rotate for transition to the access configuration.

What is claimed is:

1. A system for covering the luggage compartment of a motor vehicle, the system comprising:

two lateral supports, a front panel pivotably connected to the supports about a first transverse shaft positioned along the front edge of the panel, a rear panel pivotably connected to the supports about a second transverse shaft, the second shaft being slidably mounted longitudinally with respect to the supports, a hinge connecting the rear edge of the front panel to the front edge of the rear panel about a third transverse axis of rotation, the hinge being arranged so that, when force is applied to the second shaft in a forward direction, the panels are caused to rotate in an upward direction, causing them to transition from a covering configuration, in which they lie horizontally as an extension of each other, to an access configuration for accessing the compartment, in which they are folded against each other, the system further comprises:

a first carriage receiving a first end of the second shaft, the carriage being slidably mounted on a first longitudinal guide rail rigidly connected to a first of the supports, a first and a second cable sections, each having an end associated, with either side of the carriage, and being kept permanently tensioned along a longitudinal axis, a wheel actuated by a motor, the wheel being rigidly connected to the cable sections and adapted to be pulled in a longitudinal direction, in order to move the carriage forwards or backwards in order to move the panels into the access configuration or the covering configuration.

2. The system according to claim 1, wherein the wheel comprises two grooves arranged in levels axially with respect to the axis of rotation, each of the grooves receiving by winding a first and a second respective cable defining respectively the first and second cable sections, the cables winding in two opposite directions in the grooves in wherein the rotation of the wheel causes a winding of one and a corresponding unwinding of the other.

3. The system according to claim 2, further comprising two pulleys mounted on the first support at respective ends of travel of the first carriage, the wheel being arranged substantially between the pulleys, each of the pulleys forming a return for each of the cables to keep the sections permanently tensioned.

4. The system according to claim 2, further comprising a pulley mounted on the first support at a travel end of the first carriage, the wheel being arranged at the other end of the travel, the pulley forming a return for one of the cables to keep the sections permanently tensioned.

5. The system according to claim 1, wherein the wheel comprises a groove for receiving a cable, the end parts of the cable defining the first and second cable sections, the system further comprising a pulley mounted on the first support at a travel end of the first carriage, the wheel being arranged at the other end of the travel so that the cable forms a tight loop passing around the wheel and the pulley so as to keep the sections permanently tensioned.

6. The system according to claim 1, wherein the access configuration corresponds to a lifting of the panels by about 90° with respect to the position thereof in the covering configuration.

7. The system according to claim 1, wherein a second end of the second shaft is mounted on a second carriage, the carriage being slidably mounted on a second longitudinal guide rail rigidly connected to a second support.

8. The system according to claim 1, wherein one end of the second shaft mounted on a carriage is mounted so as to be removable.

9. The system according to claim 1, wherein the rear end of each rail is arranged so that when the panels are in the covering configuration, and when observed laterally, the lower angle defined by a first straight line connecting the second and third shafts, and by a second straight line connecting the first and third shafts, is less than 180° so that a force exerted forwards on the second shaft by the first carriage causes the panels to rotate for transition to the access configuration.

* * * * *